United States Patent
Smith et al.

(10) Patent No.: US 9,203,482 B2
(45) Date of Patent: Dec. 1, 2015

(54) RADIO COMMUNICATIONS DEVICE WITH ADAPTIVE COMBINATION

(75) Inventors: Martin Smith, Chelmsford (GB); Dawn Power, Bishops Stortford (GB); Sonya Amos, Bishops Stortford (GB); Dean Kitchener, Brentwood (GB)

(73) Assignee: Apple Inc., Cupertino, CA (US)

( * ) Notice: Subject to any disclaimer, the term of this patent is extended or adjusted under 35 U.S.C. 154(b) by 644 days.

(21) Appl. No.: 11/363,359

(22) Filed: Feb. 27, 2006

(65) Prior Publication Data

US 2006/0176974 A1    Aug. 10, 2006

Related U.S. Application Data

(62) Division of application No. 10/083,094, filed on Feb. 26, 2002, now abandoned.

(51) Int. Cl.
| | |
|---|---|
| H04K 1/10 | (2006.01) |
| H04L 27/28 | (2006.01) |
| H04B 7/04 | (2006.01) |
| H04B 7/06 | (2006.01) |
| H04B 7/08 | (2006.01) |

(52) U.S. Cl.
CPC ............ *H04B 7/0413* (2013.01); *H04B 7/0408* (2013.01); *H04B 7/0617* (2013.01); *H04B 7/0848* (2013.01)

(58) Field of Classification Search
CPC ... H04B 7/0408; H04B 7/0413; H04B 7/0617
USPC .......................... 375/267, 347, 260, 295, 316
See application file for complete search history.

(56) References Cited

U.S. PATENT DOCUMENTS

| | | | |
|---|---|---|---|
| 5,159,707 A | | 10/1992 | Mogi |
| 5,329,555 A | * | 7/1994 | Marko et al. ................... 375/347 |
| 5,945,959 A | * | 8/1999 | Tanidokoro et al. .......... 343/728 |
| 6,438,389 B1 | * | 8/2002 | Sandhu et al. ............. 455/562.1 |
| 6,512,480 B1 | * | 1/2003 | Reudink ........................ 342/361 |
| 6,622,013 B1 | * | 9/2003 | Miyoshi et al. ............. 455/277.2 |
| 6,728,554 B1 | * | 4/2004 | Wegner ....................... 455/562.1 |
| 6,801,790 B2 | * | 10/2004 | Rudrapatna ................ 455/562.1 |
| 2001/0018793 A1 | * | 9/2001 | McKinnon et al. ............. 29/600 |
| 2002/0102950 A1 | * | 8/2002 | Gore et al. ..................... 455/101 |

FOREIGN PATENT DOCUMENTS

WO    WO-98/09381 A1    3/1998

OTHER PUBLICATIONS

Polarization . . . ; Kermoal, J.P. et al.; Veh. Tech. Conf., 2001 VTC 2001 Fall, IEEE VTS 54th; vol. 1, Issue, 2001 pp. 22-26 vol. 1; Dig. Obj. Ident. 10.1109/VTC.2001.956547.

Kermoal et al, Polarization Diversity in MIMO Radio Channels: Experimental Validation of a Stochastic . . . , Center for PersonKommunikation, Aalborg University, pp. 22-26.

* cited by examiner

*Primary Examiner* — Freshteh N Aghdam
(74) *Attorney, Agent, or Firm* — Meyertons, Hood, Kivlin, Kowert & Goetzel, P.C.

(57) ABSTRACT

To reduce costs in multiple-input multiple-output (MIMO) and other wireless communication systems an arrangement is described whereby adaptive combination is used at user equipment in order to produce two or more directional antenna beams. Improvements in carrier to interference levels result.

17 Claims, 15 Drawing Sheets

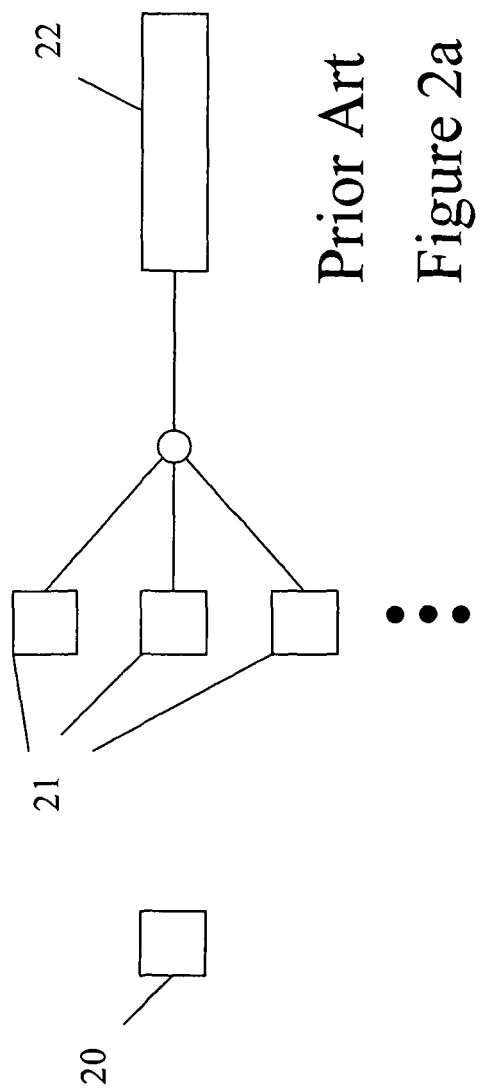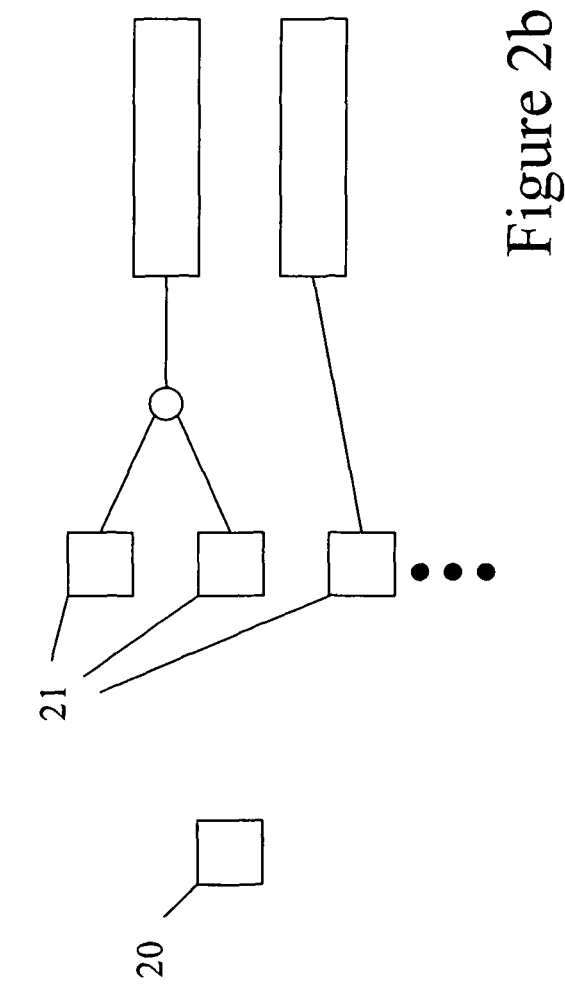

MIMO configuration with 2 Node B antennas and 4 UE antennas

Comparison of eigenvalues for standard 2:2 MIMO and eigenvalue selection diversity (best 2 from 4) using the maximum sum of eigenvalues as the selection metric.

41 —— Max Eig, best 2 from 4
42 —— Min Eig, best 2 from 4
43 ---- 2:2 (standard), max Eig
44 ---- 2:2 standard, Min Eig

4-antenna (1,2) (1,3) (1,4) (2,3) (2,4) (3,4)

disjoint switch example of overlap switch
(keep Ant #1)

6-antenna (1,2) (1,3) (1,4) (1,5) (1,6) (2,3) (2,4) (2,5)
(2,6) (3,4) (3,5) (3,6) (4,5) (4,6) (5,6)

disjoint switch example of overlap switch
(keep Ant #1)

Figure 6

|  | Configuration 1 | | Configuration 2 | |
|---|---|---|---|---|
| Average signal level (dB) | 180° | 4.6 | 180° | 3.9 |
|  | 90° | 6.7 | 90° | 4.8 |
| Signal level spread (dB) | 180° | 1.4 | 180° | 1.5 |
|  | 90° | 0.5 | 90° | 0.3 |
| Average standard deviation (dB) | 180° | 4.1 | 180° | 1.7 |
|  | 90° | 1.4 | 90° | 0.4 |
| Lowest maximum achievable diversity gain (dB) (unit 0° orientation) | 11.5 | | 15 | |
| Lowest maximum achievable diversity gain (dB) (unit 45° orientation) | 14.5 | | 14 | |

Figure 12

Elements 231 & 233 – umbrella monopoles polarised at nominally +45°

Element 232 – folded slot & 234 – monopole, which are nominally polarised to -45°.

RADIO COMMUNICATIONS DEVICE WITH ADAPTIVE COMBINATION

RELATED APPLICATION

This application is a division of U.S. patent application Ser. No. 10/083,094, filed Feb. 26, 2002 now abandoned.

FIELD OF THE INVENTION

The present invention relates to radio communications devices with adaptive combination.

BACKGROUND TO THE INVENTION

The demand for wireless communication systems has grown steadily over recent decades, and has included several technological jumps over this time, particularly in the area of cellular and wireless local area network (WLAN) communication systems. Analogue cellular phones have been replaced with digital handsets using for example GSM and CDMA technologies, and so called third generation systems such as UMTS are now being introduced. Similarly WLAN technologies such as HyperLan and IEEE 802.11b are also being introduced. The number of users continues to increase and data traffic is now becoming an important part of the wireless network. Both of these factors mean that it is important for operators to look for methods of increasing the capacity of their networks to meet future demands.

As well as the need to increase capacity there is a general requirement to keep costs down whilst providing good performance. For example, costs for basestation and user terminal equipment should be reduced where possible whilst still enabling satisfactory wireless services to be provided.

One performance related problem relates to multipath fading. Typically basestations and user terminals are located in "cluttered" environments. This means that communications signals arrive at such basestations or user terminals via many paths because of scattering due to reflections and diffractions from buildings, furniture or other objects in the environment. Incoming scattered signals can add constructively or destructively depending on the relative amplitude and phase of the different components. This means that the received signal at the basestation or user terminal varies considerably in magnitude depending on the relative location of the basestation, user terminal and other objects in the environment. This effect is known as multipath fading.

Previously, one way of addressing multipath fading has been to use transmit or receive antenna diversity. Receive antenna diversity involves transmitting from one transmit antenna whilst providing two or more diverse receive antennas (e.g. with spatial or polarisation diversity). By using diverse antennas uncorrelated signals are received at those antennas. When one of those signals is in a fade the other is typically unfaded. In the case of switched antenna diversity, one of the receive antennas is selected for reception at any one time. Alternatively, adaptive combination is used in conjunction with all the receive antennas to produce one channel output. Thus in the ideal situation, the receive antennas can always be used to obtain an unfaded signal.

A similar situation occurs for transmit diversity. Here two or more diverse transmit antennas are used in conjunction with one receive antenna. Feedback about receive performance is used to either select one of the transmit antennas to use at a particular time, or to adjust adaptive combination of the transmit antennas to create one channel output. The present invention seeks to provide improved capacity and performance as compared with such known transmit and receive diversity antenna arrangements.

Another known approach for increasing capacity involves using multiple-input multiple-output (MIMO) communications systems to increase data rates. A MIMO wireless communications system (see FIG. 1) is one which comprises a plurality of antennas 10 at the transmitter 11 and two or more antennas 12 at the receiver 13. The antennas 10, 12 are employed in a multi-path rich environment such that due to the presence of various scattering objects (buildings, cars, hills, etc.) in the environment, each signal experiences multipath propagation. Thus a cloud shape 14 is shown in FIG. 1 to represent the scattered signals between the transmit and receive antennas. User data is transmitted from the transmit antennas using a space-time coding (STC) transmission method as is known in the art. The receive antennas 12 capture the transmitted signals and a signal processing technique is then applied as known in the art, to separate the transmitted signals and recover the user data.

MIMO wireless communication systems are advantageous in that they enable the capacity of the wireless link between the transmitter and receiver to be improved compared with previous systems in the respect that higher data rates can be obtained. The multipath rich environment enables multiple orthogonal channels to be generated between the transmitter and receiver. Data for a single user can then be transmitted over the air in parallel over those channels, simultaneously and using the same bandwidth. Consequently, higher spectral efficiencies are achieved than with non-MIMO systems.

However, one problem with known MIMO arrangements is that they are relatively expensive in the respect that multiple antennas are required together with multiple transmit and receive chains. One receive antenna is used for each MIMO channel. Thus, for example, a receive MIMO antenna arrangement can comprise four antennas together with four receive chains one for each of those antennas. Receive chains are relatively expensive, bulky and power must be provided to each of those receive chains. This is particularly disadvantageous for user terminals that are required to be compact and also for basestations which need to be unobtrusive. Similar problems occur for transmit chains.

An object of the present invention is to provide a radio communications device which overcomes or at least mitigates one or more of the problems noted above.

Further benefits and advantages of the invention will become apparent from a consideration of the following detailed description given with reference to the accompanying drawings, which specify and show preferred embodiments of the invention.

SUMMARY OF THE INVENTION

According to an aspect of the present invention there is provided a radio communications device comprising
a plurality of antenna elements; and
a combiner arranged to adaptively combine said antenna elements such that two or more directional antenna beams are provided which are diverse.

This provides the advantage that directional antenna beams are used in a communications system which, for a plurality of such devices in a network, reduces overall carrier to interference levels and hence increases capacity. The device may be either a basestation or a user terminal. For example, the user terminal can be a mobile telephone, a personal digital assistant, a personal computer, a subscriber premises installation or any other suitable type of terminal. Also, the combiner preferably comprises at least one beamformer or the antenna elements are provided as a phased array. Preferably, the communications system is a multiple-input multiple-output communications system. In this case the advantages of increased data rates are achieved in addition to improvements in carrier to interference levels.

Preferably the antenna beams are diverse as a result of any of polarisation diversity, angle diversity and space diversity.

In a preferred embodiment a pair of antenna beams is provided with substantially orthogonal polarisations and at substantially similar directions. MIMO communications can then be provided over the two antenna beams to create a high data rate link.

The combiner is preferably arranged to electronically steer the directional antenna beams. This provides the advantage that problems associated with spatial fading are addressed by steering the beam. Also, because the direction of the antenna beams can be adjusted, pointing losses are reduced as compared with systems that use fixed directional beams.

The invention also encompasses a method of operating a radio communications device comprising the steps of:
  receiving radio signals at a plurality of antenna elements by;
  using a combiner to adaptively combine the antenna elements such that they are operable in at least one direction to receive two or more diverse channels.

A corresponding method for transmitting is also provided. Preferably, the signals are space-time coded and a multiple-input multiple-output radio communications device is used.

The invention is directed to a method by which the described apparatus operates and including method steps for carrying out every function of the apparatus.

The invention also provides for a system for the purposes of digital signal processing which comprises one or more instances of apparatus embodying the present invention, together with other additional apparatus.

The preferred features may be combined as appropriate, as would be apparent to a skilled person, and may be combined with any of the aspects of the invention.

BRIEF DESCRIPTION OF THE DRAWINGS

In order to show how the invention may be carried into effect, embodiments of the invention are now described below by way of example only and with reference to the accompanying figures in which:

FIG. 2a is a schematic diagram of a prior art receive diversity antenna arrangement;

FIG. 2b is a schematic diagram of an embodiment of the present invention using transmit or receive diversity in either a MIMO or a non-MIMO system;

FIG. 6 illustrates possible switching configurations for two situations namely, (4 antennas, 2 receive chains) and (6 antennas, 2 receive chains);

FIG. 12 is a table of performance measures for the antenna arrangements of FIGS. 10 and 11;

DETAILED DESCRIPTION OF INVENTION

Figure 1:
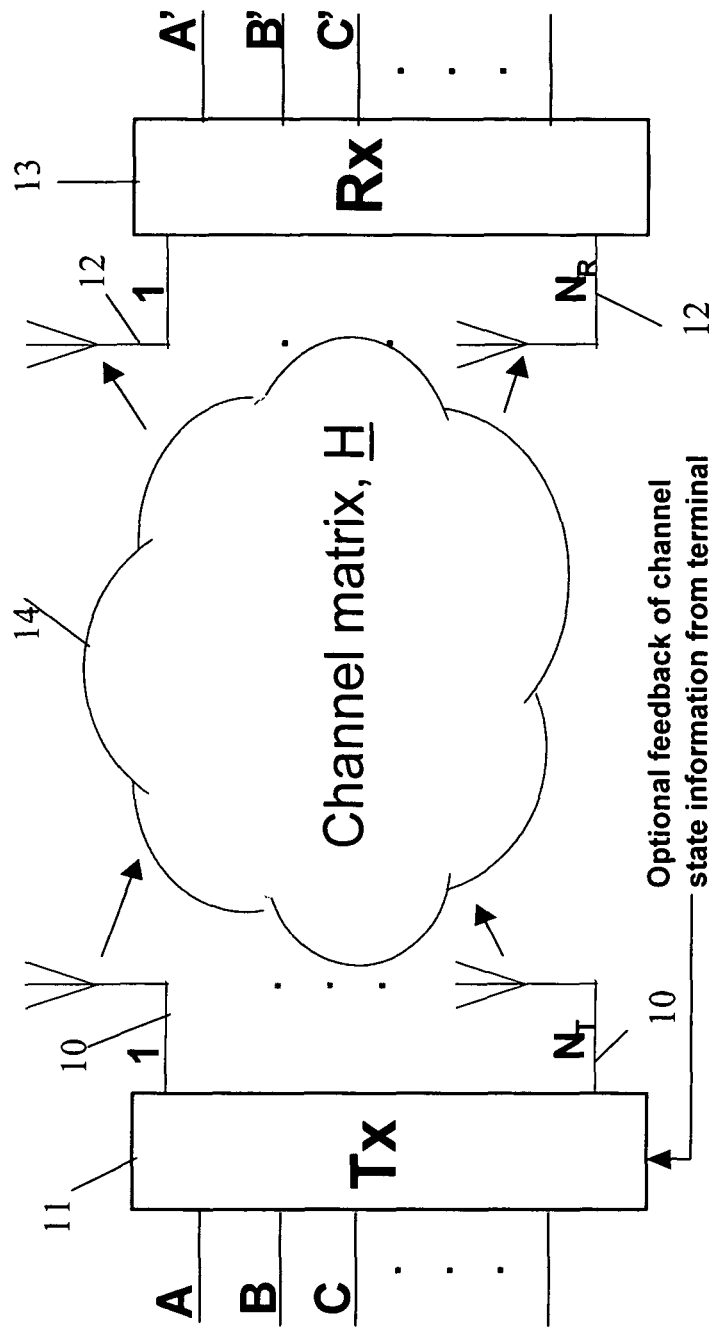
FIG. 1 is a schematic diagram of a prior art MIMO wireless communications system.

Embodiments of the present invention are described below by way of example only. These examples represent the best ways of putting the invention into practice that are currently known to the Applicant although they are not the only ways in which this could be achieved.

The term "receive chain" is used to refer to any part of apparatus which processes radio frequency signals received at a receiver by downconverting those signals to baseband frequency. This involves many stages of filtering, demodulation and downconversion as known in the art. Thus the term "receive chain" is used herein to refer to either all the apparatus needed for this conversion process or only some of that apparatus.

The term "transmit chain" is used to refer to any part of apparatus which processes baseband signals and converts those to radio frequency signals for transmission at a transmitter. This involves many stages of upconverting, modulation and power amplification as known in the art. Thus the term "transmit chain" is used herein to refer to either all the apparatus needed for this conversion process or only some of that apparatus.

As mentioned above, previous MIMO systems have used as many MIMO channels as antennas. One receive chain (also referred to as a radio frequency receiver) per channel is required and this poses a practical restriction because the number of receive chains that can be provided in practice is limited by cost, complexity and power consumption in a basestation, user terminal or other communications device. This same limitation applies in the case of transmit chains. A similar practical restriction applies to non-MIMO radio communications devices such as those using transmit or receive diversity.

The present invention recognises this problem and enables the number of receive or transmit chains to be reduced whilst still increasing the number of antennas. That is, more receive antennas are used than receive chains (or more transmit antennas than transmit chains). For both MIMO and non-MIMO arrangements many benefits are achieved in this way including increases in capacity, improved carrier to interference levels, reduced costs and improved ability to cope with multipath fading. It is acknowledged that prior art transmit or receive diversity antenna arrangements are known with more receive antennas than receive chains for example. However, these have involved using a plurality of diverse antennas and producing a single channel output from those diverse antennas, by switched selection. The present invention recognises that additional benefits can be achieved by producing two or more channels of output from those diverse antennas. In this case, three or more diverse antennas must be used. These benefits include an improved ability to cope with multipath fading and improved receive gain.

A prior art receive diversity antenna arrangement is illustrated in FIG. 2a. One transmit antenna 20 transmits to three or more receive antennas 21 which are arranged to have diversity with respect to one another. A single receive chain 22 is provided and switched antenna selection is used to produce one channel input to the receive chain 22. In this non-MIMO arrangement more receive antennas than receive chains are used and because the receive antennas are diverse the effects of multipath fading are reduced as explained above.

An embodiment of the present invention is illustrated in FIG. 2b. This is a non-MIMO arrangement using receive antenna diversity in a similar manner to that of FIG. 2a. One transmit antenna 20 transmits to three or more receive antennas 21. However, two receive chains 22 are provided. It is also possible to use more than two receive chains 22 as long as there are always more receive antennas than there are receive chains. A subset of the outputs of the receive antennas are selected to be consistent with the number of receive chains. Various advantages are obtained as compared with the prior art situation in FIG. 2a. For example, the receive gain is increased because there are more receive chains. Also, the ability to deal with the effects of multipath fading is improved. For example, consider the prior art situation in which one receive antenna is selected from three receive antennas. The ability to cope well with multipath fading depends on whether the signal received at that chosen antenna is subject to fading. However, in the embodiment illustrated in FIG. 2b, two receive antennas are effectively selected from three possible receive antennas. Because two antennas are selected rather than one the ability to deal with multipath fading is improved as discussed in more detail below.

Although FIGS. 2a and 2b are concerned with receive diversity, similar situations occur for transmit diversity.

As mentioned above the present invention is applicable to MIMO communications systems as well as to non-MIMO arrangements such as those illustrated in FIG. 2b. As mentioned above with respect to FIG. 1 MIMO systems use a plurality of antennas at both transmit and receive, together with a space-time coding system. A plurality of orthogonal MIMO channels occur (as a result of scattering) and capacity increases are achieved as a result (compared with non-MIMO multibeam antenna arrangements for example). Thus the system of FIG. 2b has an additional advantage over the system of FIG. 2a because FIG. 2b can be used in a MIMO system whereas that of 2a cannot.

Previously, MIMO arrangements have used the same number of antennas as MIMO channels and thus the same number of receive chains as receive antennas (or transmit chains as transmit antennas). The present invention recognises that advantages are obtained by using fewer receive chains than receive antennas as illustrated in FIG. 2b with a MIMO system (or fewer transmit chains than transmit antennas).

We have shown that by using more receive antennas than receive chains in a MIMO system, capacity increases are obtained as compared with reducing the number of antennas to match the number of receive chains. This is the case both for nomadic user terminals which are moved from place to place, but are generally static when in use and also for mobile terminals which are moveable during use. The situation involving nomadic user terminals is now discussed.

Nomadic User Terminals

Nomadic user terminals are typically located indoors in environments where scattering occurs. Spatial fading of the multipath in the indoor environment has an envelope that is Rayleigh distributed, and this results in a MIMO link capacity which is dependent on the spatial location of the nomadic terminal. For a given area of constant local mean one obtains a capacity distribution for the MIMO link when that terminal is moved through spatial fading. Thus it is possible for any given user terminal to be placed in a "bad" location where the capacity is at the bottom end of the capacity distribution.

The theoretical Shannon capacity for a MIMO link is dependent on the spatially averaged carrier to interference levels and on the instantaneous received voltages on each MIMO path (when the mean power on each path has been normalised to unity). A capacity distribution then arises, because of the spatial fading of the MIMO paths. For a static terminal there is still some fading on the paths which is caused by the movement of objects in the environment. As a result the temporal fading tends to be Ricean with a high K-factor. Consequently, if a user terminal is placed in a 'bad' spot it tends to remain bad for the duration of the link. This is particularly bad if the delay spread is low such that there is only one resolvable tap in the time domain (no time diversity in CDMA systems), and a flat channel in the frequency domain (no frequency diversity in OFDM systems). This is likely to be the case, for example, in residential suburban environments (e.g. small office, home office SOHO applications).

In order to circumvent this problem we have equipped the user terminal with more antennas than it has receive chains. We show that a type of eigenvalue selection diversity can be employed which improves the lower end of the MIMO Shannon capacity distribution by about 20%. This in turn increases the overall throughput. The method is now described.

In a preferred embodiment a MIMO configuration is provided whereby there are two antennas at the basestation (also referred to as Node B), four antennas at the user terminal (also referred to as user equipment, UE), but only two receive chains at the UE. The situation is illustrated in FIG. 3, which shows two transmit antennas 30, four receive antennas 31 and connections h11, h12, h21, h22, h31, h32, h41, h42 between those entities.

Figure 3:
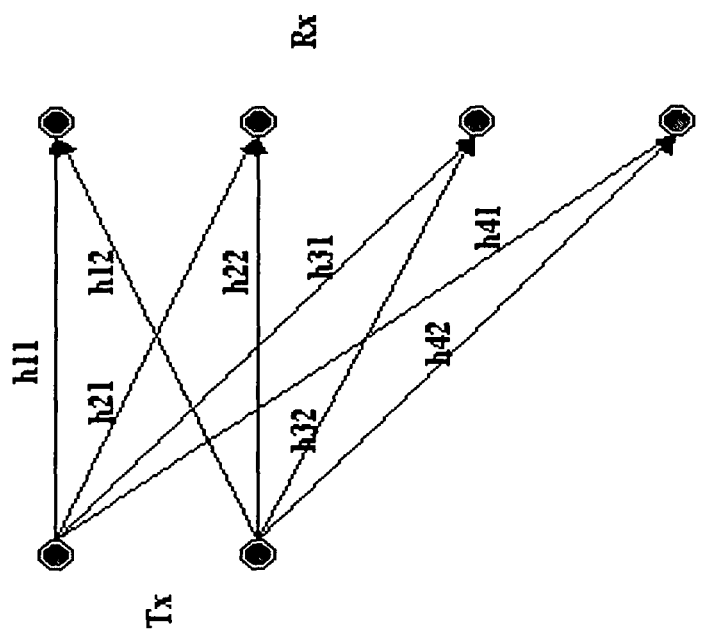
FIG. 3 is a schematic diagram of a MIMO configuration according to an embodiment of the present invention.

In the embodiment shown in FIG. 3, the actual MIMO configuration is 2:2 because there are only 2 receive chains at the UE. However there are six possible 2:2 MIMO matrices that the UE can choose from. These are as follows:—

$$H_{UE1,UE2} = \begin{bmatrix} h_{11} & h_{21} \\ h_{12} & h_{22} \end{bmatrix}$$

$$H_{UE1,UE3} = \begin{bmatrix} h_{11} & h_{31} \\ h_{12} & h_{32} \end{bmatrix}$$

$$H_{UE1,UE4} = \begin{bmatrix} h_{11} & h_{41} \\ h_{12} & h_{42} \end{bmatrix}$$

$$H_{UE2,UE3} = \begin{bmatrix} h_{21} & h_{31} \\ h_{22} & h_{32} \end{bmatrix}$$

$$H_{UE2,UE4} = \begin{bmatrix} h_{21} & h_{41} \\ h_{22} & h_{42} \end{bmatrix}$$

$$H_{UE3,UE4} = \begin{bmatrix} h_{31} & h_{41} \\ h_{32} & h_{42} \end{bmatrix}$$

As an example, each of the MIMO paths can be represented as a random Gaussian process, having a mean power of unity.

The paths are independent (uncorrelated) and power imbalance between the paths is not considered. Each path is represented by the following equation:—

$$h_{mn} = N\left(0, \frac{1}{\sqrt{2}}\right) + jN\left(0, \frac{1}{\sqrt{2}}\right) \quad (1)$$

where $$N\left(0, \frac{1}{\sqrt{2}}\right)$$

is a random number having a normal distribution with a mean of zero and a standard deviation of $$\frac{1}{\sqrt{2}}.$$

Thus, each matrix element consists of a complex voltage where the I and Q components are normally distributed. These result in an envelope which is Rayleigh distributed with a mean power of $2\sigma^2=1$.

Using this expression for each MIMO path (with different samples of the random variable) the six instantaneous 2:2 channel matrices can be constructed. Then, for each instance the eigenvalues of the channel product matrix can be determined, where the channel product matrix is given by the following:—

$$H_{UEm,UEn}H_{UEm,UEn}^H = \begin{bmatrix} h_{m1} & h_{n1} \\ h_{m2} & h_{n2} \end{bmatrix} \cdot \begin{bmatrix} h_{m1}^* & h_{m2}^* \\ h_{n1}^* & h_{n2}^* \end{bmatrix} \quad (2)$$

The eigenvalues of this matrix represent the power gains of the eigenmodes, of which there will be two.

The upper Shannon bound on capacity for a 2:2 MIMO configuration with independent Rayleigh fading channels can be determined using the following formula:—

$$C = \sum_{i=1}^{N} \log_2\left(1 + \frac{\lambda_i}{N}\rho\right) \quad (2)$$

where,
N=Number of transmit antennas
$\lambda_i$=ith eigenvalue
$\rho$=Signal to noise ratio The capacity is the sum of the Shannon capacities of N orthogonal channels, where the power gains of the channels are given by the eigenvalues of the channel product matrix. In this sum the available transmit power is equally distributed between the two channels.

In order to implement an eigenvalue selection diversity scheme a metric is required to enable selection between the six possible UE antenna combinations. Two different metrics are considered:—
Sum of eigenvalues;
Shannon capacity.

Figure 4:
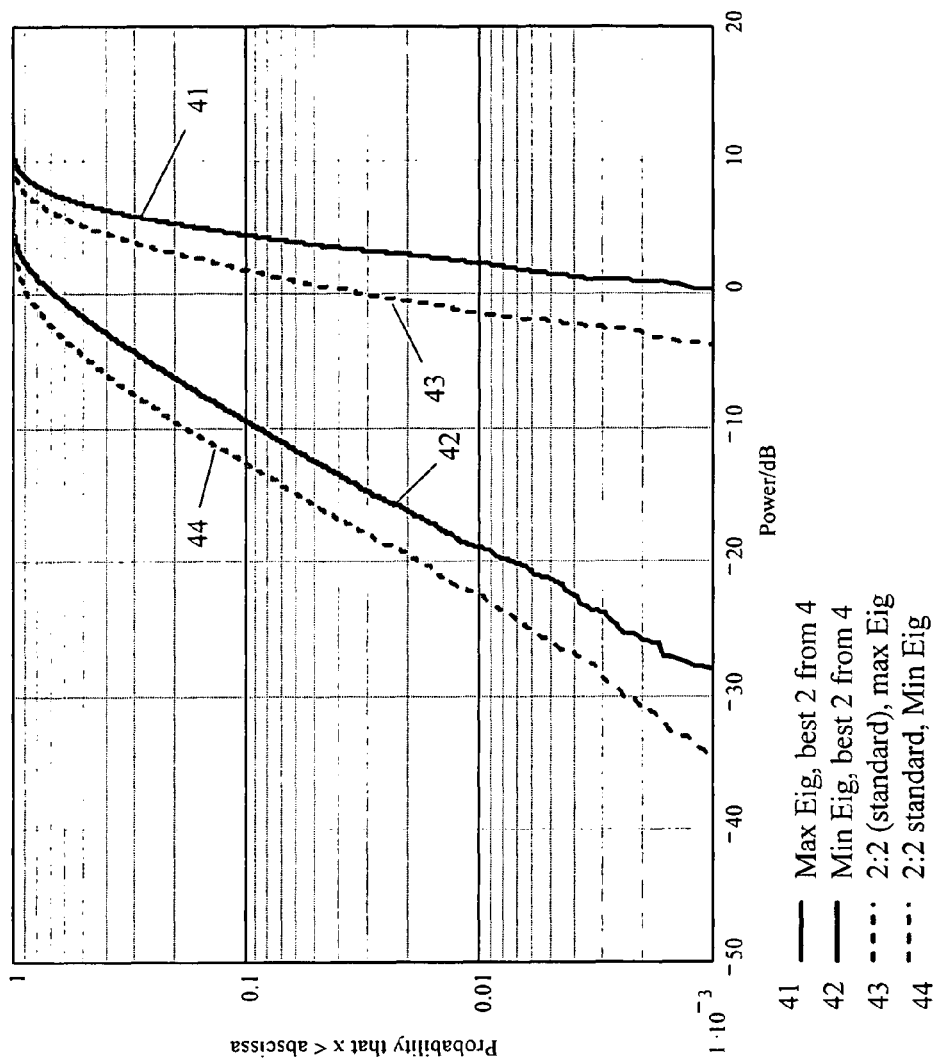
FIG. 4 is a graph of eigenvalue distributions for standard 2:2 MIMO and eigenvalue selection diversity (best 2 from 4) using the maximum sum of eigenvalues as the selection metric.

In the first instance, the sum of the eigenvalues for each UE antenna pair was calculated and the combination with the maximum sum was selected. This was done for ten thousand instances of the random variables. The 2:2 matrix for UE elements UE1 and UE2 was taken to be a reference matrix, and the Shannon capacity distribution was calculated for this case. This represents the standard 2:2 MIMO capacity distribution. The capacity distribution was also calculated for the case where eigenvalue selection diversity was implemented for each instance of the random variables, using the maximum 'sum of eigenvalues' as the selection metric. The eigenvalue distributions for the reference and diversity cases are shown in FIG. 4. This shows a clear increase in the eigenvalue distributions when eigenvalue diversity is employed.

In the case that the selection metric is the maximum instantaneous link capacity we investigated the capacity distributions. The eigenvalue selection diversity improved the lower end of the capacity distribution, although in this case the improvement is greater than for the case where the maximum sum of eigenvalues is used as the selection metric. The capacity distributions for the two forms of eigenvalue selection diversity were compared. The difference between the two schemes is only significant at high SNR's.

For the 'sum of eigenvalues' scheme the six 2:2 channel matrices are estimated and the eigenvalues computed. This is preferably done on an average basis to average out any effects of temporal fading. For the maximum capacity scheme the eigenvalues are estimated as well as the signal to noise ratio (SNR) or carrier to interference level (C/I). Estimates of the instantaneous capacity are then made for the six possible channel matrices. Some averaging is used to eliminate any effects of temporal fading.

We also compared the capacity distribution for a standard 2:4 MIMO configuration to the capacity distribution for the 'maximum capacity' eigenvalue selection diversity scheme. The 2:4 MIMO system achieves a higher capacity, but this would require four receive chains at the UE rather than two. The 'maximum capacity' eigenvalue selection diversity curves were also compared to the capacity curves for 2:2 and 2:4 MIMO configurations. It was found that the eigenvalue selection diversity scheme achieved a significant part of the extra capacity gain that could be obtained from a 2:4 MIMO system with four receive chains.

In the examples described immediately above with respect to nomadic terminals, two selection metrics were considered, one being the sum of the eigenvalues and the other being the instantaneous link capacity. It is not essential to use these particular selection metrics and as discussed below other types of metric can be used. In addition, the results described above with respect to nomadic terminals also apply to mobile terminal situations at least to some extent.

Switching Mechanism

Figure 5:
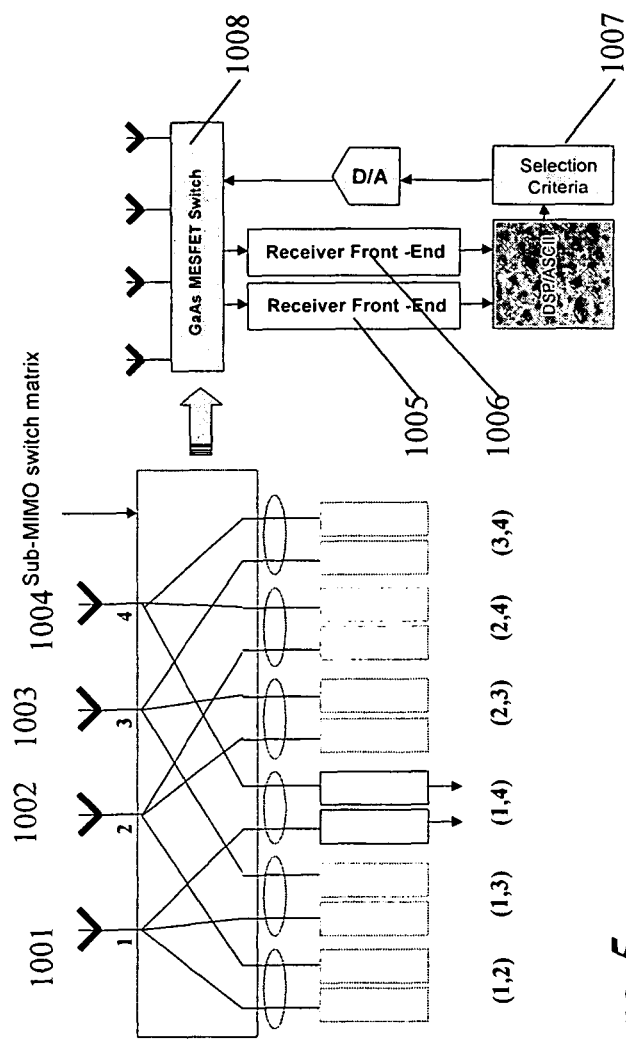
FIG. 5 is a schematic diagram of a MIMO switching receiver architecture.

Consider an example of a MIMO switching receiver architecture as illustrated in FIG. 5. For receive antennas 1001 to 1004 are shown with only two receive chains 1005, 1006, (also referred to as receiver front-ends). There are six possible selections of two antennas from the four available. For a given time instant the receiver can only monitor and measure the reception condition of two antennas. Thus we establish intelligent switching criteria to allow selection of the best pair of antennas. In order to minimise implementation costs the processing required 1007 to select two antennas is implemented in the base-band processing region of the receiver processing. However, this is not essential. Also, the mechanism for switching between the antennas 1008 is implemented directly at antenna output. For example, using a GaAs MESFET high-speed switch, integrated into a Low Noise Amplifier (LNA) with a 3-bit switch command generated from a base-band modem. The average insertion loss for such a GaAs MESFET switch is low (e.g. around 0.1 dB) and the cost is also low.

Mobile Terminals—High Speed Mobility

We have also found that MIMO configurations in which there are fewer receive chains than receive antennas can advantageously be used for high speed mobility applications where the user terminal is moving at speeds of up to about 100 km/hour. In one such embodiment using two transmit antennas, and selecting two from four receive antennas for use with two receive chains, we found a 3 dB gain as compared with standard 2:2 MIMO.

Selection Metrics

Two selection metrics were mentioned above, one being related to the link capacity and the other being the sum of the eigenvalues. Other selection metrics or methods can be used and some examples are given below:

- Receive signal strength indicator (RSSI) (i.e. choose the selection which gives the highest RSSI)
- Decoder output bit error rate (BER) (i.e. choose the selection which gives the lowest BER)
- Round-robin strategy (i.e. try each possible selection in turn and choose the best)
- Shannon capacity (i.e. choose the selection which gives the highest Shannon capacity or highest instantaneous link capacity)
- Eigenvalues (i.e. choose the selection which gives the highest sum of the eigenvalues)
- CRC triggered switch (i.e. following the FEC decoding, if CRC detection is erroneous then one or both receivers switch to another antenna/antennas according to a predetermined rule or by searching for the best antenna selection.

Consider the situation in which the number of receive chains L is less than the number of receiving antennas M. In that case there are a total of $K=M!/L!(M-L)!$ possible switching configurations where the symbol ! indicates "factorial". It is beneficial to perform a full search of all possible switching configurations at the expense of high computational complexity. However, this is not essential as explained below. In FIG. 6 we illustrate possible switching configurations for two situations namely, (4 antennas, 2 receive chains) and (6 antennas, 2 receive chains). Once a given set of antennas are selected, it is preferable that the next set of selected antennas does not contain a single identical antenna to the first set. We refer to such sets as being disjoint. For example, in the case of 4-antenna and 2-receive, if the current selection is (1,2) the possible selections to switch to are (1,3), (1,4), (2,3), (2,4) and (3,4). However, we have found that the best switch strategy is to select disjoint set (3,4). In the case of 6-antenna, 2-receive, for each starting selection we have six disjoint selections to switch to. In FIG. 3, we only show the switch transition for (1,2) (1,3) (1,4) (1,5) (1,6), however, among the disjoint switch strategies we show the simplest switch rule: (1,2)⇔(3,4)⇔(5,6).

The best switch rules depicted in FIG. 3: (1,2)⇔(3,4) and (1,2)⇔(3,4)⇔(5,6) have another significance in terms of antenna configuration because they are well suited for polarised receive antenna arrangements.

Alternatively, in the case of two receive-chains, we could keep one of the currently selected antennas (the one with the better channel quality) and switch the other currently selected antenna. In FIG. 3, for the 4 antenna case with the configuration (1, 2), where antenna 1 is kept, the possible switch transitions are then (1, 3) and (1, 4). For the 6 antenna case with the configuration (1, 2), where antenna 1 is kept, the possible switch transitions are then (1, 3), (1, 4), (1, 5) and (1, 6). We refer to such sets as being overlapping. That is overlapping sets contain at least one common antenna.

Figure 7:
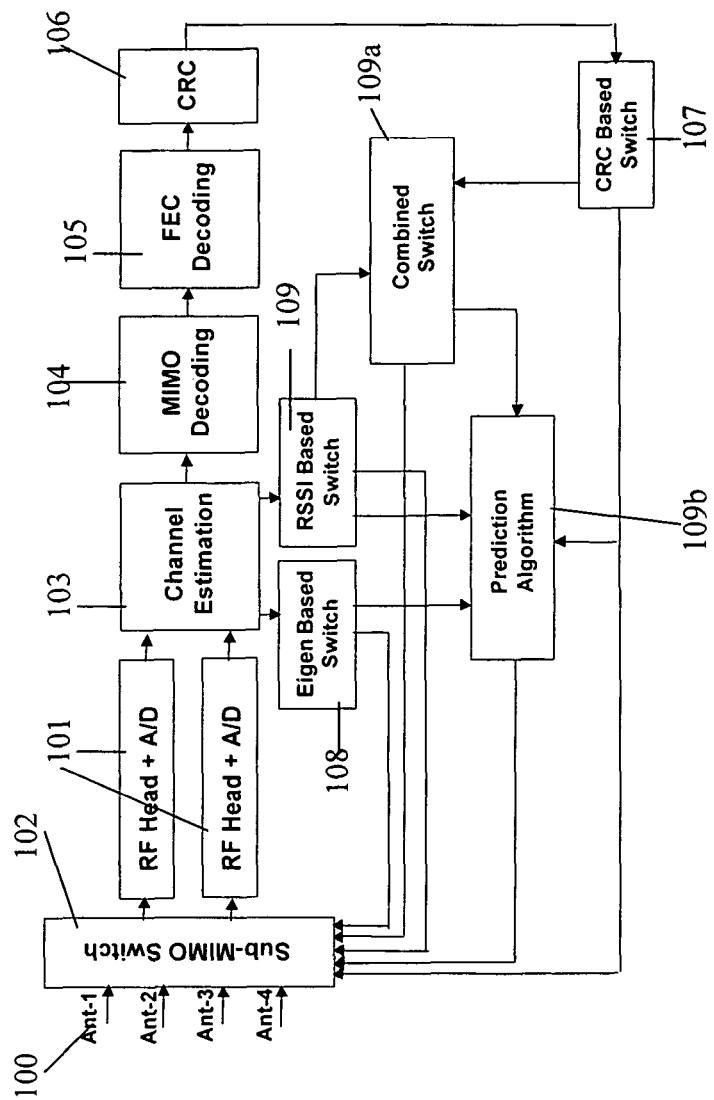
FIG. 7 illustrates processing in a MIMO system and selection metrics used for antenna switched selection.

FIG. 7 is a schematic diagram of the processing that occurs in a MIMO system once the MIMO channels are received. It also shows how some of the selection metrics mentioned above can be used to effect switching between the antennas. In the particular example illustrated in FIG. 7 there are four receive antennas 100 and two receive chains 101. A switching mechanism 102 is used to switch between the antennas. The receive chains 101 provide output to a channel estimator 103 as known in the art. This estimates the MIMO channels and provides output to a MIMO decoder 104 which decodes the space-time coded signals. The decoded signals are then processed by a forward error correction (FEC) decoder and finally by a cyclic redundancy check unit (CRC) 106. As illustrated in FIG. 7 the results 107 of the CRC unit 106 can be provided as input to the switch mechanism 102 via a CRC based switch 107. Alternatively the results from the channel estimator 103 can be provided to the switch mechanism via an eigenvalue based switch 108 or an RSSI based switch 109 as shown.

The switching criteria comprising RSSI, Shannon Capacity and eigenvalues (as mentioned above) can be implemented at base-band signal processing at the MIMO channel estimation output 103 (see FIG. 7). The CRC based metric is implemented at the FEC decoder output as shown. Prediction algorithms 109b may be used in conjunction with the RSSI, Shannon Capacity and Eigenvalue based criteria in order to select the best antennas in the absence of measurements of all possible antenna combinations. For example, information about past performance of those antenna selections may be used to make predictions.

Using a simulation we have compared the performance of the various selection methods and metrics mentioned above and the results are shown in FIG. 8 which is a graph of bit error rate (BER) against signal to noise ratio (SNR). Our simulation was made using OFDM waveform as physical layer signalling for the situation involving four receive antennas and two receive chains at a user equipment moving at a speed of 100 km/h.

Figure 8:
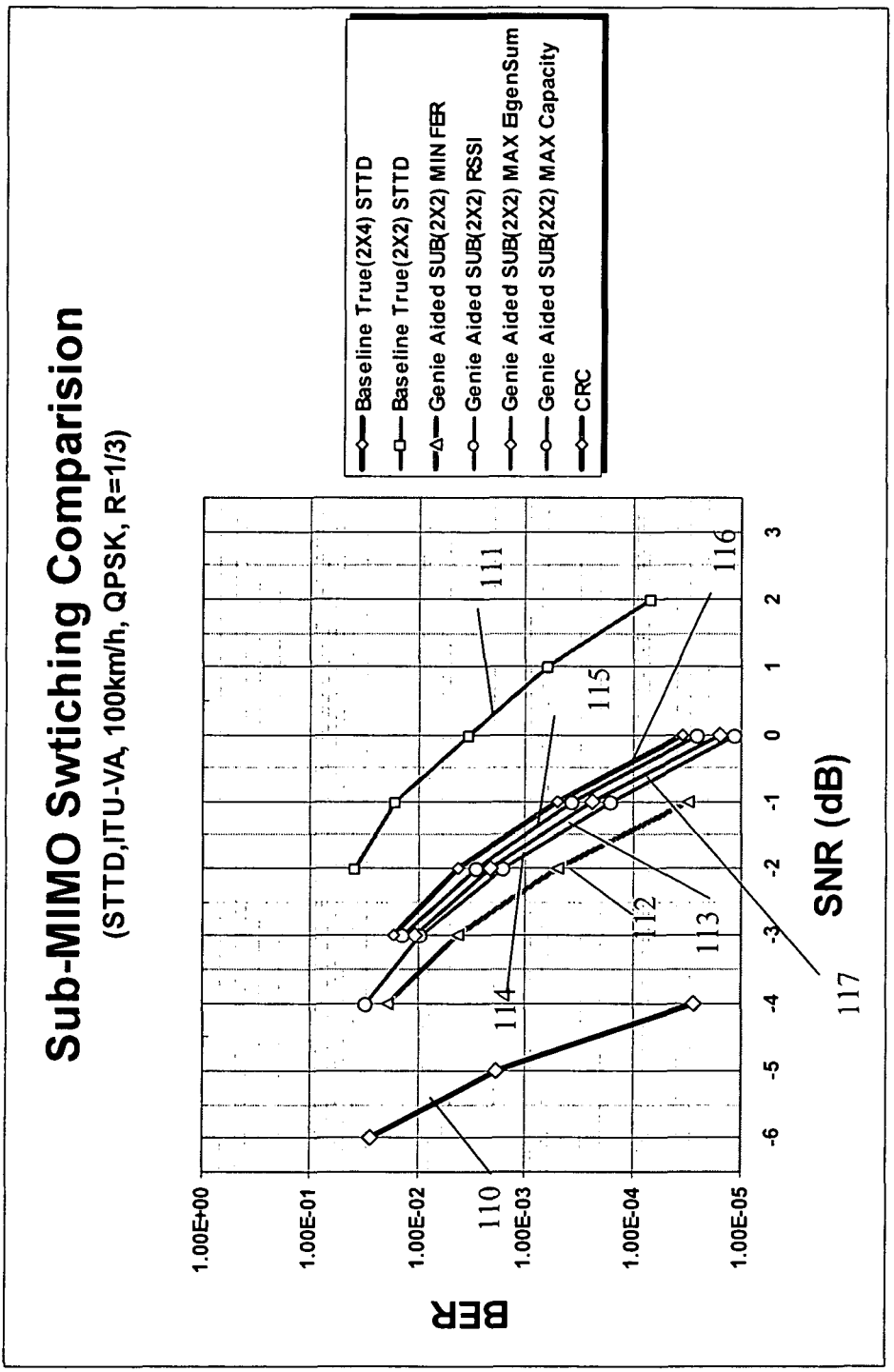
FIG. 8 is a graph of bit error rate against signal to noise ratio for various antenna switched selection methods.

The best performance was found when using the minimum BER as the selection metric (see line 112 in FIG. 8). However, this metric is relatively complex to compute. The next best performance was found when using the RSSI criterion calculated assuming perfect apriori MIMO channel knowledge or perfect channel prediction (see line 113). We use the term "genie aided" to refer to the fact that perfect apriori MIMO channel knowledge or perfect channel prediction is assumed. The next best performance was found for the genie aided maximum of eigen value summation (see line 114). The next best performance was found for the genie aided maximum of channel capacity (see line 115) which is relatively complex to compute compared with say the summation of eigen value. The next best performance was found for the CRC triggered switch without the MIMO channel knowledge (see line 116). This method has the advantage of being relatively simple to compute because MIMO systems typically monitor CRC anyway. Thus to implement a switched selection method using CRC based metrics is relatively straightforward. Also, the performance of the genie aided metrics was found to be close to the CRC triggered blind switch.

Thus in a preferred embodiment of the present invention the selection metric is related to CRC. Also we have found that by using CRC based metrics the number of times at which switching is deemed to be required is far fewer than when using the eigenvalue based metrics. Thus when eigenvalue based metrics are used additional criteria such as some type of threshold mechanism may be required to prevent too frequent switching between antennas.

Figure 9:
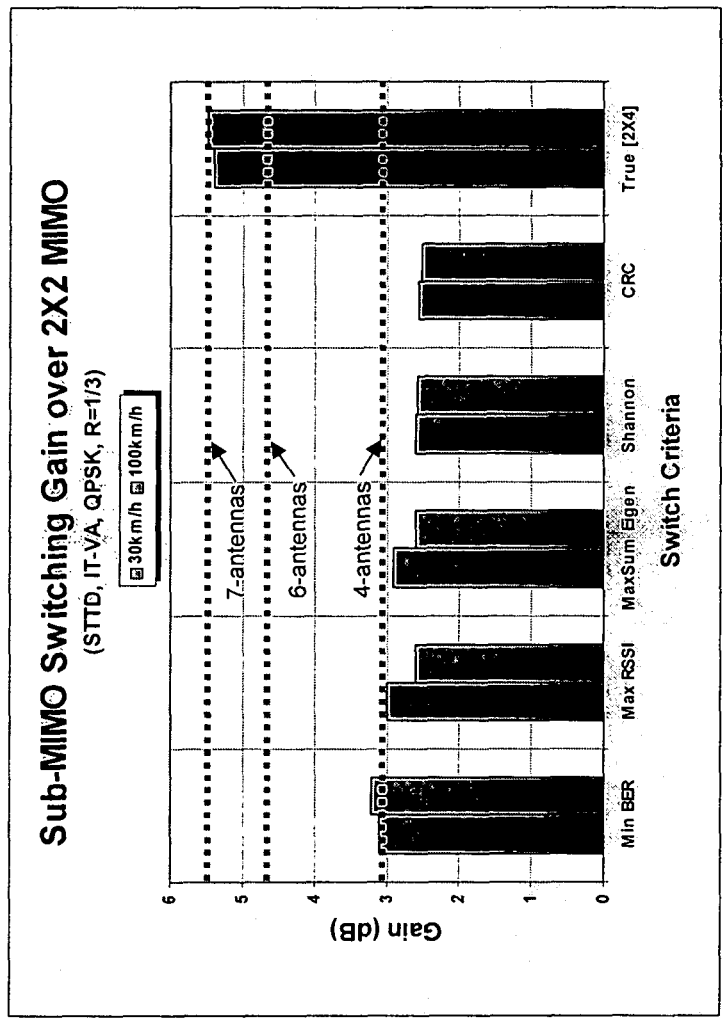
FIG. 9 is a graph of simulation results comprising the gain for a 4-antenna and 2-receive chain selection arrangement compared to a true 2×2 MIMO and 2×4 MIMO arrangement. The upper-bound of the gain for the selection from 4, 6 and 8 antennas is computed based on Equation 50. Results are shown for a user equipment moving at 30 km/h (left most column of each pair) and at 100 km/h (right most column of each pair).

Results of our further simulations are shown in FIG. 9. Again a 2×4 MIMO is simulated where the user equipment is configured with 4 receive antennas and 2 receive chains. Six possible selections of two antennas are possible and denoted as $$H_{i,j} = \begin{bmatrix} h_{i,1} & h_{j,1} \\ h_{i,2} & h_{j,2} \end{bmatrix}$$

where i,j=1, 2, 3, 4. In order to obtain the upper bound of the selection performance, we simulated the situation using three selection criteria (RSSI, Shannon Capacity, and Eigenvalues) using genie aided calculations; that is assuming perfect apriori channel knowledge or perfection channel prediction. All six possible selections could be selected. The CRC based criterion was simulated with real world receiver operation. The switch criteria used in the simulations are described below in more detail where $\lambda_1, \lambda_2$ are the eigen values of matrix $H_{i,j}$.

| Criteria | Computing Rule | Comment |
| --- | --- | --- |
| | Select sub-MIMO with minimum FEC decoding bit errors | Perfect Prediction |
| | $\max_{i,j \in (1,2,3,4)} \{h_{i,1}^2 + h_{i,2}^2 + h_{j,1}^2 + h_{j,2}^2\}$ | Perfect Prediction |
| Max_Eign | $\max_{i,j \in (1,2,3,4)} \{\lambda_1 + \lambda_2\}$ | Perfect Prediction |
| Max_Capacity | $\max_{i,j \in (1,2,3,4)} \left\{ \left(\log\left(1 + \frac{\lambda_1 \rho}{2}\right)\right)_{i,j} + \left(\log\left(1 + \frac{\lambda_2 \rho}{2}\right)\right)_{i,j} \right\}$ | Perfect Prediction |
| CRC | If CRC detects encoder block error, then switch to the sub-MIMO under the rule (1,2) ↔ (3,4) | Blind Switch |

FIG. 9 shows the simulation results comprising the gain for the 4-antenna and 2-receive chain selection arrangement compared to a true 2×2 MIMO and 2×4 MIMO. In addition the theoretical gain (upper bound) for 4, 6 and 7 antennas are also plotted, the mathematical derivation is shown in equation 50 in Appendix-A. As we can see clearly, the selection methods all provide significant gain over static 2×2 MIMO with the same receiver-front-end hardware complexity. In particular, the CRC based selection method can achieve a gain close to the genie aided switch criteria.

Although the selection metrics discussed above have been described with reference to selection from receive antennas these metrics can also be used for selection between transmit antennas by using any type of feedback mechanism from the receive apparatus to the transmit apparatus.

Use of Directional Antennas

When we consider situations involving a plurality of user terminals interference can occur as a result of signals from one terminal reaching another terminal and interfering with signals from a basestation to that terminal. By using directional antennas at the user terminals, for example, as previously implemented in fixed wireless access arrangements, it is possible to reduce such interference as compared with a reference situation using omnidirectional antennas at the user terminals. However we have found that by using directional antennas at the user terminal in a MIMO system, and in addition, using switched antenna selection at the user terminal, significant advantages are found. Even though switched selection effectively reduces the number of antenna elements which would be expected to reduce the resulting MIMO performance, we have found that benefits can be achieved.

This is explained in more detail below with respect to several embodiments concerning a MIMO antenna arrangement in a stand-alone unit for use with a user terminal such as a personal computer. In these embodiments an antenna arrangement for a user terminal is provided such that the user terminal can use a high data rate MIMO wireless link. Preferably the MIMO link comprises four orthogonal channels with similar signal levels in order to facilitate increase in capacity as a result of the use of MIMO communications.

The antenna arrangement is supported in a box, cube, or other stand alone structure which can be connected to a personal computer, laptop computer, personal digital assistant, or any other type of user terminal. This provides the advantage that the antenna arrangement is easily placed on a desk, table or other surface and can be used in conjunction with any suitable type of user terminal rather than being permanently integrated into one user terminal. The size of the antenna arrangement is minimised in order that the stand alone unit is compact and portable.

Figure 10:
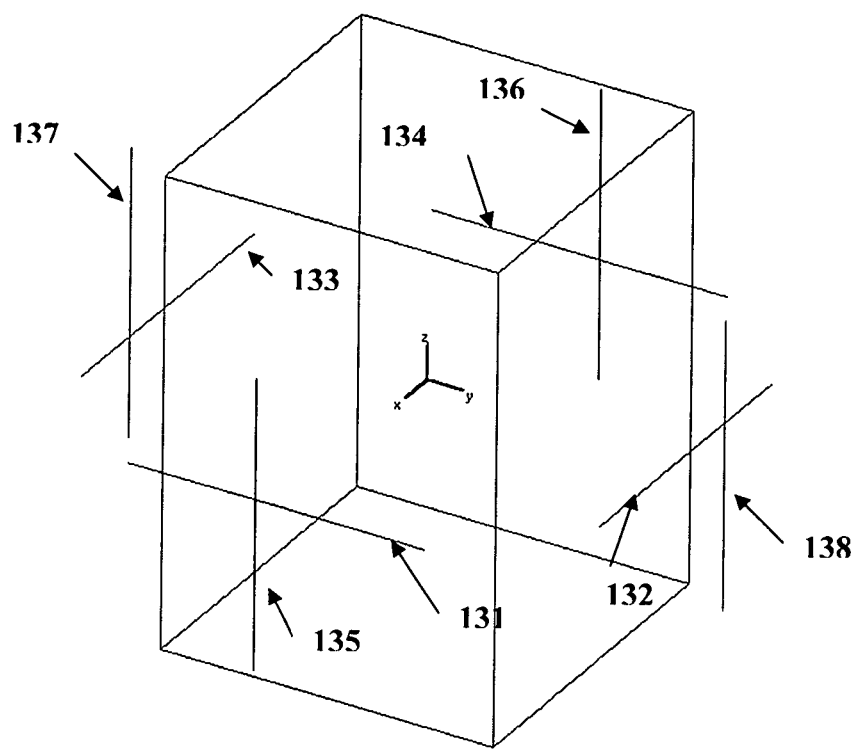
FIGS. 10 and 11 each show an antenna arrangement for use with a stand alone user equipment.
Figure 11:
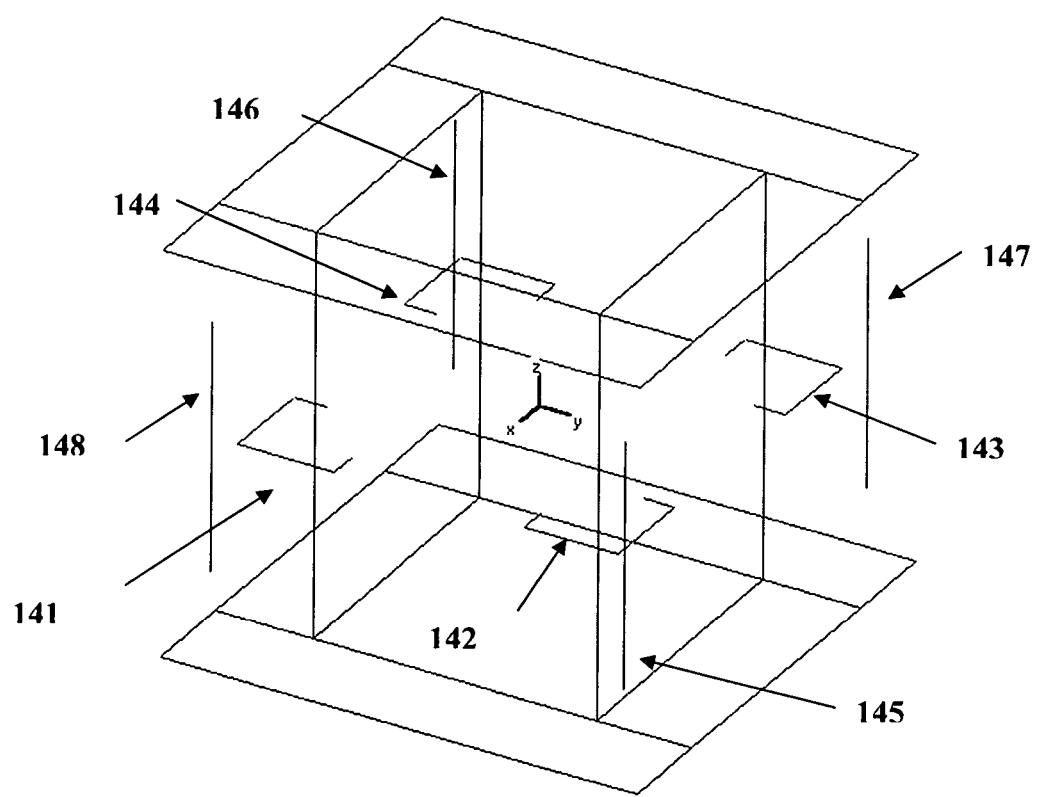

FIGS. 10 and 11 illustrate two possible antenna arrangements each supported by a stand alone unit 128 of dimensions 9 cm×9 cm×13 cm or any other suitable size which can be hand held. FIG. 10 shows an arrangement using eight dipoles 131-138 one horizontal and one vertical dipole being supported from each of four faces of the unit. The antennas stand away from the surface of the unit to which they are connected by feed and ground pins. The four faces are chosen such that when the unit is stood on one face, the opposite face (top) has no dipoles. The vertical dipoles are supported 2.5 cm from the unit and the horizontal dipoles 3.5 cm from the unit. We found that the signal level achieved using dipoles was higher (improved) than that found using planar inverted F antennas (PIFAs). In addition, azimuth directivity was more significant for the dipole arrangement.

FIG. 11 shows another embodiment in which four vertical 145-148 and four horizontal dipoles 141-144 are again used. In this case the dipoles are supported at corners of the unit in order to broaden the azimuth pattern as compared with the arrangement of FIG. 10. The ends of the horizontal dipoles are curled or bent in towards the unit to minimise any fall in azimuth pattern which may occur at the end of the dipoles. As before the dipoles are supported or spaced away from the surface of the unit. In this embodiment a conductive plate 140, is placed on one face of the unit (top face) such that it covers that face and extends beyond each edge of that face. Another conductive plate 141 is placed covering the opposite face of the unit (bottom face). These plates are added to improve the front to back ratio of the horizontal dipoles. The plates extend beyond the unit as explained above and illustrated in FIG. 11 in order to match the front-to-back ratio of the horizontal dipole with that of the vertical dipole. In one particular example the plates extended beyond the unit by 3 cm with the dimensions of the unit then being 15 cm×15 cm×13 cm.

We compared the performance of the embodiments illustrated in FIGS. 10 and 11 and the results are given in FIG. 12. The embodiment of FIG. 10 is referred to as configuration 1. In this case the dipoles are placed over faces of the unit and are more directional than that in the arrangements of FIG. 11 (configuration 2). The results indicate that each arrangement provides a fully workable system.

FIG. 12 shows the metrics used for comparison of the stand alone configurations. Configurations 1 and 2 have metrics averaged over 90° and 180°. These configurations have directional antennas, the two averages consider 2:2 (assumed for uplink) and 2:4 MIMO (assumed for downlink). The diversity gain is given for two unit orientations, 0° and 45°. This is of interest as the stand alone unit could be placed on a surface in any orientation.

We found that configuration 1 (FIG. 10) was advantageous in that it provided the highest average gain. This eases the burden with, for example, power amplifiers, which in turn reduces cost.

In the examples described above with reference to FIGS. 10 and 11 it is assumed that the stand alone unit operates as part of a 2:2 MIMO configuration on the uplink and a 2:4 MIMO configuration on the downlink. That is on the uplink two antennas are selected (from the eight available) to transmit to two inputs at a basestation. On the downlink, four antennas at the user terminal are selected (from the eight available) to receive signals from two outputs at the basestation. However, this is not essential, any n:m MIMO configurations can be used for either the uplink or downlink where n and m are integers greater than 1.

Using a computer simulation we found that for the arrangement of FIG. 10 a 2 dB improvement in carrier to interference is obtained when using a "switching" mechanism to select the best combination of 4 antenna elements from the 8 available as opposed to using any combination of 4 of the 8 antennas.

Our simulation assumed that each nomadic user terminal (as in FIG. 10) was located in an indoor environment in a dense urban area that included other such high data rate users. A situation involving a network of 19 basestations each with 3 sectors, and 1000 subscribers served by each basestation at random locations in the network.

We also found a 3 dB improvement in carrier to interference when the best combination of 2 antenna elements are selected from the 8 available as opposed to using any combination of 2 of the 8 antennas.

Thus we have found that by using switched selection between directional antennas at the user terminal in a MIMO arrangement improvements in carrier to interference levels are found and in addition situations involving spatial fading can more effectively be dealt with.

Figure 13:
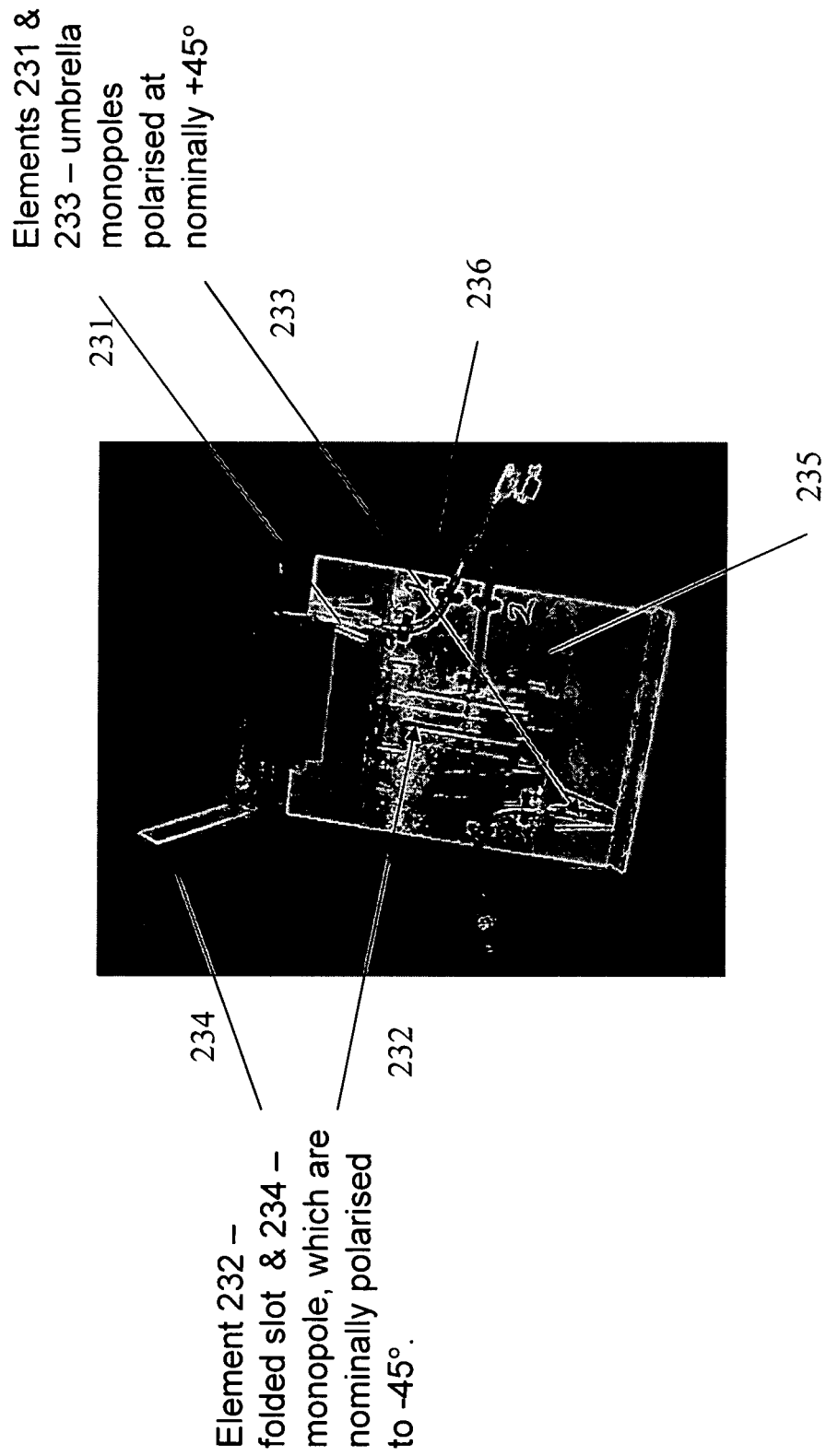
FIG. 13 shows an antenna arrangement for use in a personal digital assistant.

Switched selection between directional antennas at a MIMO user equipment is also particularly advantageous for small user equipment. In such cases the structure of the user equipment itself often blocks antenna patterns in particular directions for antennas mounted on the user equipment. A nominally omnidirectional azimuth pattern is then difficult to realise. For example, in a particular embodiment we provide 4 antennas for MIMO communications in a personal digital assistant (PDA). FIG. 13 illustrates the antenna arrangement. Of the four antennas 231-234, three 231-233 are arranged to be integrated into a support structure such as a flap. Preferably the flap is moveably connected to the PDA such that it covers a display screen face of the PDA when not in use. The flap can be arranged to fold around the side or over the top of the PDA. Preferably the flap is folded out in use such that the angle between the flap and the PDA is about 90°. However, this is not essential, any suitable angle between the flap and the PDA can be used such that polarisation diversity is provided. A ground plane 235 is integrated into the flap and is co-planar with the three antennas 231-233 in the flap. A second ground plane 236 is incorporated into the PDA itself (for example, this may be provided by circuit boards already present in the PDA body which provide the PDA functionality). An antenna 234 associated with this second ground plane is preferably mounted on the PDA so that it protrudes as shown in FIG. 13.

Figure 14:
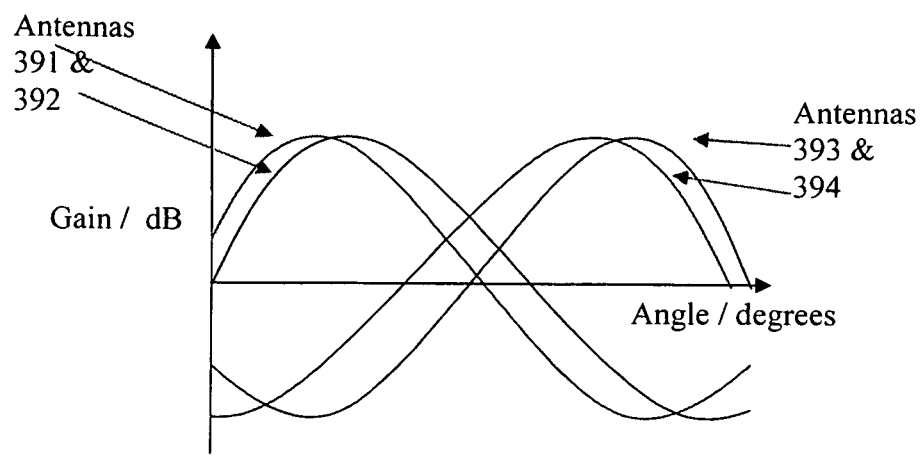
FIG. 14 shows directional antenna patterns for use with the antenna arrangement of FIG. 13.

Antennas 231 and 234 are preferably co-planar umbrella monopoles. Antenna 232 is preferably provided in the form of a slot mounted in the flap whilst antenna 234 is preferably a monopole mounted on the PDA body. We found that the profile of the PDA limited the amount of omnidirectionality of the antenna patterns because of blocking. This is addressed by using complementary directive patterns designed with the body of the PDA in mind. In a preferred example the four antennas are arranged to provide the directional antenna patterns of FIG. 14. Considering the traces in FIG. 14, it is seen that at any angle, two antenna patterns provide good signal strength. For example, complementary patterns 391 and 392 could initially be selected (in a 2:2 MIMO system with 2 from 4 switched antenna selection at the PDA). If the signal strength is found to be poor the other patterns 393 and 394 are selected. Alternatively, both options can be tested and the best pair of antennas chosen. The selection process is repeated over time to take into account changes in terminal position or in the environment.

In order to achieve the complementary directional patterns as described above any suitable method is used as known in the art.

It is noted that pointing losses are typically experienced by antenna switching systems. Such pointing losses limit the improvement in carrier to interference levels found for directional antenna systems with switched selection. One way to overcome this is to use steered beam systems, either with mechanical beam steering or adaptive combination techniques.

In the examples described above antenna selection is used to enable the number of transmit or receive claims to be reduced. A related advantage is achieved by using adaptive combination techniques which involve combining the effects of a plurality of antenna elements to produce directional antenna beams. An example is described in our earlier U.S. patent application Ser. No. 09/975,653 which is also assigned to Nortel Networks. In that document we describe a basestation antenna array with six columns of dual polarised antenna elements. The six columns have a spacing of half a wavelength in azimuth. Two fixed multiple beamformers, which do not allow beam steering, are used in conjunction with this array to form three directional antenna beams at each of the two polarisations. This basestation antenna array functions over a limited sector and as such is not suitable for user terminals which are nomadic or mobile and which may be placed in any orientation with respect to a basestation in use.

According to another aspect of the present invention we use an adaptive combination technique, in combination with a MIMO antenna arrangement. By using an adaptive combination technique to create directional antenna beams, carrier to interference levels are improved and capacity thus increased. Advantageously, the adaptive combination method can be electronically controlled in order to change the direction of the antenna beams produced.

Figure 15:
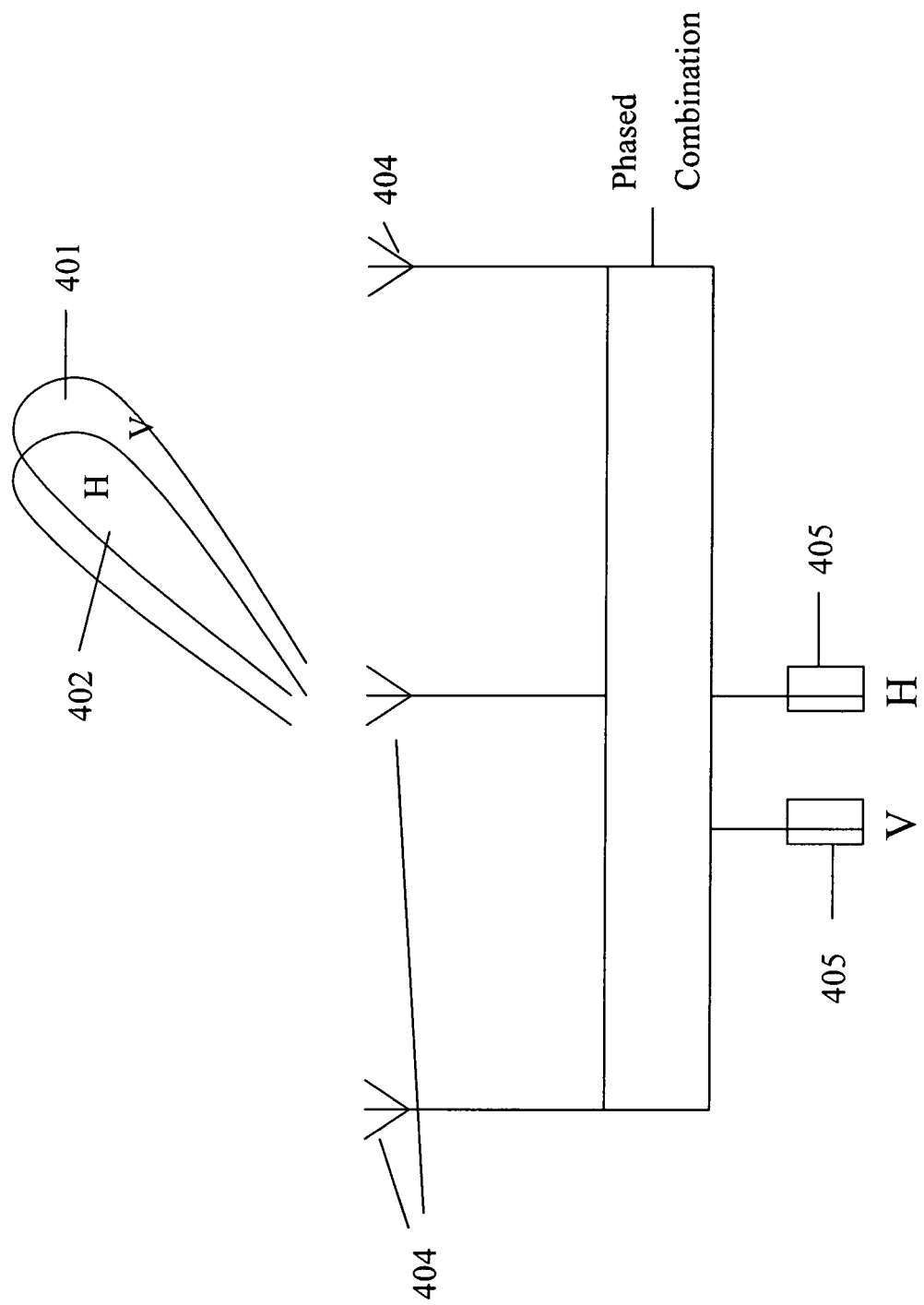
FIG. 15 is a schematic diagram of a MIMO user equipment having adaptive combination.

For example, in the embodiment of FIG. 15 an array of three antenna elements 404 is provided. The antenna elements are substantially omnidirectional and are closely spaced (i.e. not spatially diverse) and have polarisation diversity. The antenna elements 404 are adaptively combined 403 to produce a pair of directional antenna beams 401, 402 having substantially the same direction and antenna pattern but being of substantially orthogonal polarisations. Two receive chains 405 are provided. This arrangement is advantageously provided at a user terminal for example, for use in an n:2 MIMO system where n is an integer of value 2 or above. Any suitable number and arrangement of antenna elements can be used to provide two or more directional antenna beams using adaptive combination.

In order that a MIMO system can be provided the antenna beams are arranged to be diverse. For example, in the embodiment of FIG. 15, the antenna beams 401, 402 are polarisation diverse. However, they could alternatively be spatially diverse or have angular diversity.

Any suitable type of adaptive combination may be used. For example, using beamformers or by using phased combination.

Any range or device value given herein may be extended or altered without losing the effect sought, as will be apparent to the skilled person for an understanding of the teachings herein.

APPENDIX A

Suppose that all receive antennas are independent, then by picking any two receive antennas, the multi-path components of these two channels are uncorrelated, which means for a stationary process, the frequency diversity gain is unchanged comparing to the fixed antenna case. This appendix analyses antenna switching by exploiting temporal up fades. Note that this is the minimal we can achieve, as antenna switching based on both temporal up fades and frequency diversity is not concerned in this appendix. However, note that the most significant contributing factor in our system is temporal fading rather than frequency selective fading. The reason is that we can effectively mitigate the effects of frequency selective fading with a channel interleaver, but we can only effectively mitigate temporal fading with space diversity (e.g., antenna switching). This is especially true when Doppler is low, e.g., with a vehicle moving at a speed of 30 kmph.

Let $P_1 > P_2 > P_3 > P_4$ be the received powers from four receive antennas, then, with antenna switching, the average power from the two active antennas is:

$$P_{AS} = E(P_1 + P_2) \quad (10)$$

With fixed antenna, the average power received by two antennas is:

$$P_{Fix} = E\left(2 \times \frac{P_1 + P_2 + P_3 + P_4}{4}\right) = E\left(\frac{P_1 + P_2 + P_3 + P_4}{2}\right) \quad (20)$$

Therefore, the gain we can get from antenna switching is:

$$\frac{P_{AS}}{P_{Fix}} = E\left(2\frac{P_1 + P_2}{P_1 + P_2 + P_3 + P_4}\right) \quad (30)$$
$$= 2E\left(\frac{1}{1 + \frac{P_3 + P_4}{P_1 + P_2}}\right)$$
$$= 3dB - 10\log\left(1 + E\left(\frac{P_3 + P_4}{P_1 + P_2}\right)\right) dB$$

This means that the maximum gain we can get from antenna switching is 3 dB, and this happens when the signals received from the two weak antennas are negligible compared to the signals received from the two strong antennas. Note that when $P_1 = P_2 = P_3 = P_4$, the gain calculated from Equation (30) is 0 dB, which means no gain can be achieved by selecting antennas from equal strong antenna pools.

With Rayleigh fading, $$E\left(\frac{P_3 + P_4}{P_1 + P_2}\right)$$

can be fairly small. Suppose that $$E\left(\frac{P_3 + P_4}{P_1 + P_2}\right) = \frac{1}{5},$$

then the gain would be 2.2 dB.

The above results can be extended to N>4 receive antennas. With $P_1 > P_2 > \ldots > P_N$, the gain obtained from antenna switching can be updated to $$\frac{P_{AS}}{P_{Fix}} = E\left(\frac{N}{2} \frac{P_1 + P_2}{\sum_{i=1}^{N} P_i}\right) = 10\log\left(\frac{N}{2}\right) - \log\left(1 + E\left(\frac{\sum_{i=3}^{N} P_i}{P_1 + P_2}\right)\right) dB \quad (40)$$

which means the gain is bounded by $$\frac{P_{AS}}{P_{Fix}} \to 10\log\left(\frac{N}{2}\right)(dB). \quad (50)$$

If N=6, then the up-bound for the gain is 4.77 dB. Notice that this bound is achieved with $$E\left(\sum_{i=3}^{N} P_i\right) = 0.$$

With N increases, the up-bound 10 log(N/2) (dB) becomes looser and looser, as the condition of $$E\left(\sum_{i=3}^{N} P_i\right) = 0$$

is unlikely to be true.

Let $P_{high} = \lim_{N \to \infty} E(P_1) = \lim_{N \to \infty} E(P_2)$, and (60)

$$P_{ave} = \lim_{N \to \infty} E\left(\frac{\sum_{i=1}^{N} P_i}{N}\right), \text{ then}$$

$$\lim_{N \to \infty} \frac{P_{AS}}{P_{Fix}} = \lim_{N \to \infty} E\left(\frac{N}{2} \frac{P_1 + P_2}{\sum_{i=1}^{N} P_i}\right) = \frac{P_{high}}{P_{ave}}$$

Equation (0) indicates that when N→∞, the two selected antennas can always catch the up-fades, hence the gain from antenna switching equals to the peak-to-average ratio of the fade, which is channel dependent.

The invention claimed is:

1. A multiple-input multiple-output (MIMO) radio communications device comprising:
   four or more diverse antennas each suitable for receiving radio frequency signals of a radio communications technology;
   a plurality of receive chains each suitable for processing radio frequency signals of the radio communications technology to recover transmitted user data, said processing comprising performing a cyclic redundancy check and wherein there are at least twice as many antennas as receive chains; and a cyclic-redundancy check-triggered blind selector arranged to switch, for each receive chain, from an antenna currently selected for use in conjunction with that receive chain to recover the transmitted user data to a newly selected one of the antennas for use in conjunction with that receive chain, said selection of the newly selected antenna being performed by blind selection, wherein said cyclic-redundancy-check-triggered blind selector is arranged to perform said antenna selection without MIMO channel knowledge according to a pre-determined rule, and not by searching for the best antenna selection, the pre-determined rule defining a sequence for selection of antennas, said cyclic-redundancy-check-triggered blind selector being triggered to process said rule, said triggering being by the detection of one or more block errors in the cyclic redundancy check relating only to the currently selected antenna and not to any other of the antennas, whereby to trigger said blind selection, wherein said sequence for selection of antennas is such that for each of the plurality of receive chains, an antenna currently not selected for use in conjunction with any of the plurality of receive chains will be selected when said cyclic-redundancy-check-triggered blind selector is triggered.

2. A radio communications device as claimed in claim 1 wherein said antennas each have directionality.

3. A radio communications device as claimed in claim 1 wherein the diversity of the antennas is achieved via any of spatial diversity and polarisation diversity.

4. A radio communications device as claimed in claim 1 which is selected from a basestation and a user terminal.

5. A radio communications device as claimed in claim 1 wherein said selector comprises a switching mechanism arranged to switch the antennas between the receive chains.

6. A radio communications device as claimed in claim 1 wherein each of said antennas is arranged to provide a directional antenna beam and wherein at least some of those antenna beams are of substantially different pointing directions than the other antenna beams.

7. A radio communications device as claimed in claim 1 comprising four pairs of antennas each pair of antennas being supported from a body which is sized and shaped such that it is portable and suitable to be supported on a substantially flat surface.

8. A radio communications device as claimed in claim 7 wherein said body is a parallelepiped and each pair of antennas is supported from a different face of said parallelepiped.

9. A radio communications device as claimed in claim 8 wherein said antennas are dipoles.

10. A radio communications device as claimed in claim 9 wherein one of each pair of dipoles is arranged such that its ends are directed towards the body.

11. A radio communications device as claimed in claim 9 which further comprises a selector arranged to select a first subset of the antennas for transmission and a second subset of the antennas for reception.

12. A radio communications device as claimed in claim 11 where the first subset is two of the antennas and the second subset is four of the antennas.

13. A radio communications network comprising a radio communications device as claimed in claim 1.

14. A radio communications network comprising a plurality of user terminals each being a radio communications device as claimed in claim 1 and wherein each of said antennas at those user terminals is arranged to provide a directional antenna beam and wherein at least some of those antenna beams are of substantially different pointing directions than the other antenna beams.

15. A radio communications device as claimed in claim 1 wherein said cyclic-redundancy-check-triggered blind selector is further arranged, when selecting a different antenna for use in conjunction with a first of the receive chains, to not change the antenna currently selected for use in conjunction with a second of the receive chains.

16. A method of operating a multiple-input multiple-output (MIMO) radio communications device which comprises four or more diverse antennas and a plurality of receive chains each suitable for processing radio frequency signals of the radio communications technology, and wherein there are at least twice as many antennas as receive chains, said method comprising the steps of:

processing radio frequency signals of the radio communications technology to recover transmitted user data, said processing being performed by a receive chain and comprising performing a cyclic redundancy check; and switching, for each receive chain, from an antenna currently selected for use in conjunction with that receive chain to recover the transmitted user data to a newly selected one of the antennas, for use in conjunction with that receive chain, said selection of the newly selected antenna being performed by blind selection, in which said antenna selection is performed without MIMO channel knowledge according to a pre-determined rule, and not by searching for the best antenna selection, the pre-determined rule defining a sequence for selection of antennas, the selector being triggered to process said rule, said triggering being by the detection of one or more block errors in the cyclic redundancy check relating only to the currently selected antenna and not to any other of the antennas, whereby to trigger said blind selection, wherein said sequence for selection of antennas is such that for each of the plurality of receive chains, an antenna currently not selected for use in conjunction with any of the plurality of receive chains will be selected when said cyclic-redundancy-check-triggered blind selector is triggered.

17. A computer program stored on a non-transitory computer readable medium having computer readable instructions stored thereon, the computer readable instructions being executable by a computerized device to cause the computerized device to perform the method of claim 16.

* * * * *